United States Patent
Sweeney

[11] Patent Number: 5,795,459
[45] Date of Patent: Aug. 18, 1998

[54] APPARATUS AND METHOD FOR WATER PURIFICATION

[76] Inventor: Charles T. Sweeney, 708 Mockingbird La., Kerrville, Tex. 78028

[21] Appl. No.: 688,268

[22] Filed: Jul. 29, 1996

[51] Int. Cl.[6] ............................................. C02F 1/461
[52] U.S. Cl. ...................... 205/701; 205/742; 205/746; 204/271; 204/275
[58] Field of Search ........................ 205/701, 742, 205/746; 204/271, 275

[56] References Cited

U.S. PATENT DOCUMENTS

| | | | |
|---|---|---|---|
| 1,200,165 | 10/1916 | Burgess | 204/271 |
| 4,290,873 | 9/1981 | Weaver | 204/228 |
| 4,481,096 | 11/1984 | Okazaki | 204/265 |
| 5,047,128 | 9/1991 | Hawkins et al. | 204/DIG. 13 |
| 5,456,812 | 10/1995 | Chak | 204/271 |

Primary Examiner—Arun S. Phasge
Attorney, Agent, or Firm—Neal J. Mosely

[57] ABSTRACT

A small portable electrolytic cell has an enclosed electrode in a compartment and an exposed electrode open to an electrolyte into which the cell is immersed. The cell is operable when immersed in aqueous liquid containing a chloride salt to generate chlorine or other oxidant when said exposed electrode is an anode, or to increase the pH of said liquid when said exposed electrode is a cathode.

26 Claims, 5 Drawing Sheets

APPARATUS AND METHOD FOR WATER PURIFICATION

BACKGROUND OF THE INVENTION

1. FIELD OF THE INVENTION

This invention related to new and useful improvements in electrolytic cells and to methods of using such cells for purification of water, sewage effluent and other aqueous liquids.

2. BRIEF DESCRIPTION OF THE PRIOR ART

The use of chlorine for disinfecting bodies of water, such as, swimming pools, baths, reservoirs, sewage, etc. is well known. In the past, chlorine has usually been supplied by direct application of chlorine gas from tanks containing the gas under pressure. There have also been a number of commercial uses of electrolytic chlorine-generating equipment.

Lindstaedt U.S. Pat. No. 2,887,444 discloses a system in which a body of water, such as, a swimming pool, is provided with a low concentration of dissolved common salt and a stream of water is removed from the main body and electrolyzed to produce chlorine and the chlorine and water stream returned to the main body of water.

Murray U.S. Pat. No. 3,223,242 discloses another type of electrolytic cell for generating chlorine for introduction into a stream of water removed from and introduced back into a swimming pool or other body of water.

Richards U.S. Pat. No. 3,282,823 discloses an electrolytic cell for production of chlorine positioned in-line for introducing chlorine into a stream of water removed from and reintroduced into a swimming pool.

Other chlorinating systems using electrolytic cells for production of chlorine for chlorinating bodies of water are shown in Murray U.S. Pat. No. 2,361,663, Oldershaw U.S. Pat. No. 3,351,542, Colvin U.S. Pat. No. 3,378,479, Kirkham U.S. Pat. No. 3,669,857, and Yates U.S. Pat. No. 4,097,356. These electrolytic cells are disclosed in a variety of configurations and most of the cells utilize ion-permeable membranes separating the anode and cathode compartments.

Ion-permeable membrane technology used in electrolytic cells is well developed. Ion-permeable membranes used in electrolytic cells have ranged from asbestos diaphragms to carboxylate resin polymers to perfluorosulfonic acid polymer membranes. The perfluorosulfonic acid membranes were developed by DuPont for use in electrolytic cells.

Dotson U.S. Pat. No. 3,793,163 discloses the use of Dupont perfluoro-sulfonic acid membranes in electrolytic cells and makes reference to U.S. Pat. No. 2,636,851; 3,017,338; 3,560,568; 3,496,077; 2,967,807; 3,282,875 and British Patent 1,184,321 as disclosing such membranes and various uses thereof.

Walmsley U.S. Pat. No. 3,909,378 discloses another type of fluorination exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat. No. 4,010,085 and Westerlund U.S. Pat. No. 4,069,128.

Discussion of perfluorosulfonic acid membranes is also discussed in the technical literature, e.g., Dupont Magazine, May–June 1973, pages 22–25 and a paper entitled "Perfluorinated Ion Exchange Membrane" by Grot, Munn and Walmsley, presented to the 141st National Meeting of the Electro-Chemical Society, Houston, Tex., May 7–11,1972.

The structure of electrodes used in electrolytic cells is set forth in most of the patents listed above. Additionally, the following U.S. Patents disclose particular configurations of anodes or cathodes used in electrolytic cells.

Giacopelli U.S. Pat. No. 3,375,184 discloses an electrolytic cell with controllable multiple electrodes which are flat plates of wedge-shaped configuration.

Ettel U.S. Pat. No. 3,821,097 discloses the use of flat plates in electroplating cells.

Lohrberg U.S. Pat. No. 3,951,767 discloses the use of flat plate electrolytic anodes having grooves along the bottoms thereof for conducting gas bubbles generated in the electrolytic process.

Andreoli U.S. Pat. No. 565,953 discloses electroplating apparatus having a plurality of metal screens which are not connected in the electric circuit and function to plate out the metal being separated by the electrolysis.

As discussed above, electrolytic production of chlorine and other oxidants for use in water purification is well known in the literature and in patents. The following patents are representative of the prior art on miniaturization of electrolytic cells.

Fair et al U.S. Pat. No. 4,714,534 discloses an electrolytic cell used to produce dilute quantities of a halogen solution from water containing dilute quantities of salt to disinfect and sanitize the water. The cell further employs mono-polar electrodes of trapezoidal shape and an electrode separating plates that ensures proper alignment and equal separation of the electrode plates during operation.

Okazaki U.S. Pat. No. 4,481,096 discloses a pot-typed water purifier with an electrolyzer which comprises a pot body having an opening at the top thereof, the pot body including an electrolyzing vessel divided into two chambers by a porous partition formed into a hollow shape, the chambers having therein negative and positive electrodes to form negative and positive chambers, respectively, a storage chamber airtightly separated from the electrolyzing vessel, means for supplying air pressure to the negative chamber and storage chamber alternatively so as to transport the water from the negative chamber to the storage chamber or to transport water from the storage chamber to a pouring nozzle, and a cover detachably covering said opening at the top of the pot body, said opening being adapted to supply water to the electrolyzing vessel.

Frame U.S. Pat. No. 4,419,206 discloses an electronic water treating device for treatment of the flow of water through a pipe conduit system to reduce the formation of mineral deposits on water heaters and other devices interconnected in the conduit system in residences and industrial water supply systems. The electronic or electrolysis effect of the direct flow of current from a graphite anode to a stainless steel canister cathode to disrupt the collection of calcium and magnesium particles being attracted to the colloids suspended in the water, and in its ultimate effect reduce the formation of scale in the system as well as facilitating the flushing or removal of accumulated deposits in the system.

Zoltan et al U.S. Pat. No. 4,332,664 discloses a gas producing electrolytic cell for portable devices comprising a vessel, an electrolyte, a cap, a gas space, channel labyrinths, a separating wall and contacts. The channel labyrinths eliminate the outflow of the electrolyte from the cell in its overturned position, tender the return of electrolyte to the vessel, to the original level possible. The contacts can be inundated by the electrolyte and in this way an outer electric circuit can be closed for cutting out the stream of electrolyze and for signalizating the overturned position of the cell.

Paschakarnis et al U.S. Pat. No. 4,119,520 discloses a purification unit having an electrolytic cell adapted to hold a body of water to be purified and having two electrically insulated electrodes, a pump supplying the water to be purified to the cell through a filter and driving purified water out of the unit, a power supply for supplying electrolyzing current to the electrodes, a control circuit which generates a sensible signal indicative of the operating conditions of the pump, the power supply, and the filter, and a housing which encloses the cell, the pump, the power supply, and the control circuit.

Okazaki U.S. Pat. No. 4,107,021 discloses a water pot with an electrolyzing device with a pot body having an opening at the top thereof and a handle. The pot body has an electrolyzing vessel divided into two chambers by a porous partition formed into a hollow shape, the chambers having negative and positive electrodes. Water is removed from the positive electrode chamber after an electrolyzing operation. A cover is detachably mountable on the opening at the top of the pot body, the opening being adapted to supply water to the vessel and the hollow porous partition being adapted to be inserted into the vessel and removed therefrom through said opening. A nozzle formed in the cover or in the remaining portion of the pot body communicates with the negative electrode chamber.

Fischer U.S. Pat. No. 4,089,768 discloses an electrolytic water purification system operated from a battery including an electrolytic cell which may purify water properly only when an applied voltage exceeds the battery output voltage. A power supply circuit energized by the battery furnishes the necessary higher voltage. An electrically driven pump is directly energized by the battery for pumping the water to be purified through the cell. The pump is automatically de-energized when the conductivity of the water or the available voltage is outside prescribed limits.

Reis U.S. Pat. No. 4,061,556 discloses an electrolytic purification apparatus having a receiving chamber and an electrolytic cell. The receiving chamber communicates with a filling aperture at the top of the housing which is upwardly open in the operating position of the apparatus. A first conduit connects a bottom portion of the chamber with an inlet portion of the cell, and a second conduit connects an outlet portion of the cell, upwardly spaced from the inlet portion but lower than the filling aperture, with a discharge aperture at the lower end of the housing. The chamber, cell, and conduits define a continuous path of liquid flow from the filling to the discharge aperture, the path extending downward in the chamber, upward in the cell, and downward again in the second conduit. Two electrodes, offset from the flow path in the cell in opposite, transverse directions, are supplied with direct current for passage of the current in the cell through liquid flowing in the afore-described flow path.

Hushihara U.S. Pat. No. 3,623,969 discloses a method of processing water including of the steps of filling water into two separate chambers formed by dividing a container made of a nonconductive material with a common porous wall and then passing direct current between electrodes each located within one of the chambers for separating the water into acidic water and alkaline water.

SUMMARY OF THE INVENTION

One of the objects of this invention is to provide a new and improved apparatus of treatment and method of treatment of bodies of water, such as, swimming pools, baths, drinking water, reservoirs, sewage, etc., utilizing a small portable electrolytic cell and associated apparatus of novel construction.

Another object of this invention is to provide a new and improved small portable electrolytic cell for treatment of water to oxidize contaminants or to raise the pH of the water.

Another object of this invention is to provide a new and improved small portable electrolytic cell for treatment of water to oxidize contaminants or to raise the pH of the water and having a hook for supporting the cell on the wall of a container of water being treated.

Another object of this invention is to provide a new and improved small portable electrolytic cell, of a size suitable for carrying on the person or in a pocket of an individual, for treatment of water to oxidize contaminants or to raise the pH of the water.

Another object of this invention is to provide a new and improved small portable electrolytic cell, of a size suitable for carrying on the person or in a pocket of an individual, for treatment of water to oxidize contaminants or to raise the pH of the water, and powered by batteries or by a D.C.-output transformer.

Another object of this invention is to provide a new and improved electrolytic cell for water treatment comprising an enclosed compartment containing one electrode and another electrode supported on the compartment open to the surrounding liquid when the cell is immersed in water.

Another object of this invention is to provide a new and improved electrolytic cell for water treatment comprising an enclosed compartment containing one electrode and another electrode supported on the compartment open to the surrounding liquid when the cell is immersed in water, the compartment having a vent opening above the water level therein of a size permitting venting of gas but small enough to prevent leakage when the cell is laid on its side.

Another object of this invention is to provide a new and improved electrolytic cell for water treatment comprising an enclosed compartment containing a cathode and an anode electrode supported on the compartment open to the surrounding liquid when the cell is immersed in water.

Another object of this invention is to provide a new and improved electrolytic cell for water treatment comprising an enclosed compartment containing an anode and a cathode supported on the compartment open to the surrounding liquid when the cell is immersed in water.

Another object of this invention is to provide a new and improved electrolytic cell for water treatment comprising an enclosed compartment containing one electrode, an opening in a wall of the compartment closed by an ion-permeable membrane, and another electrode supported on the compartment, adjacent to the membrane and open to the surrounding liquid when the cell is immersed in water.

Another object of this invention is to provide a new and improved electrolytic cell for water treatment comprising an enclosed compartment containing one electrode, an opening in a wall of the compartment closed by a cation-permeable membrane, and another electrode supported on the compartment, adjacent to the membrane and open to the surrounding liquid when the cell is immersed in water.

Another object of this invention is to provide a new and improved electrolytic cell for water treatment comprising an enclosed compartment containing a cathode and an anode, supported on the compartment, adjacent to the membrane and open to the surrounding liquid when the cell is immersed in water.

Another object of this invention is to provide a new and improved electrolytic cell for water treatment comprising an enclosed compartment containing an anode and a cathode supported on the compartment, adjacent to the membrane and open to the surrounding liquid when the cell is immersed in water.

Another object of this invention is to provide a new and improved method for treatment of water to oxidize contaminants or to raise the pH of the water by providing small portable electrolytic cell, inserting the cell into water and energizing the cell for treatment of water to oxidize contaminants or to raise the pH of the water.

Another object of this invention is to provide a new and improved method for treatment of water to oxidize contaminants or to raise the pH of the water by providing small portable electrolytic cell, of a size suitable for carrying on the person or in a pocket of an individual, inserting the cell into water and energizing the cell for treatment of water to oxidize contaminants or to raise the pH of the water.

Another object of this invention is to provide a new and improved method for treatment of water to oxidize contaminants or to raise the pH of the water by providing small portable electrolytic cell, powered by batteries or by a D.C.-output transformer, of a size suitable for carrying on the person or in a pocket of an individual, inserting the cell into water and energizing the cell for treatment of water to oxidize contaminants or to raise the pH of the water.

Another object of this invention is to provide a new and improved method for treatment of water to oxidize contaminants or to raise the pH of the water by providing small portable electrolytic cell for water treatment comprising an enclosed compartment containing one electrode and another electrode supported on the compartment open to the surrounding liquid when the cell is immersed in water, inserting the cell into water and energizing the cell for treatment of water to oxidize contaminants or to raise the pH of the water.

Another object of this invention is to provide a new and improved method for treatment of water to oxidize contaminants or to raise the pH of the water by providing small portable electrolytic cell for water treatment comprising an enclosed compartment containing one electrode and another electrode supported on the compartment open to the surrounding liquid when the cell is immersed in water, providing an aqueous solution of sodium chloride or sodium hydroxide in the compartment, inserting the cell into water and energizing the cell for treatment of water to oxidize contaminants or to raise the pH of the water.

Another object of this invention is to provide a new and improved method for treatment of water to oxidize contaminants or to raise the pH of the water by providing small portable electrolytic cell for water treatment comprising an enclosed compartment containing one electrode and another electrode supported on the compartment open to the surrounding liquid when the cell is immersed in water, the compartment having a vent opening above the water level therein of a size permitting venting of gas but small enough to prevent leakage in the cell is laid on its side, providing an aqueous solution of sodium chloride or sodium hydroxide in the compartment, inserting the cell into water and energizing the cell for treatment of water to oxidize contaminants or to raise the pH of the water.

Another object of this invention is to provide a new and improved method for treatment of water to oxidize contaminants or to raise the pH of the water by providing small portable electrolytic cell, having an enclosed compartment containing an anode and a cathode supported on the compartment open to the surrounding liquid when the cell is immersed in water, inserting the cell into water and energizing the cell for treatment of water to oxidize contaminants or to raise the pH of the water.

Another object of this invention is to provide a new and improved method for treatment of water to oxidize contaminants or to raise the pH of the water by providing small portable electrolytic cell, having an enclosed compartment containing an anode, an opening in a wall of the compartment closed by an ion-permeable membrane, and a cathode supported on the compartment adjacent to the membrane open to the surrounding liquid when the cell is immersed in water, inserting the cell into water and energizing the cell for treatment of water to oxidize contaminants or to raise the pH of the water.

Another object of this invention is to provide a new and improved method for treatment of water to oxidize contaminants or to raise the pH of the water by providing small portable electrolytic cell, having an enclosed compartment containing a cathode, an opening in a wall of the compartment closed by an ion-permeable membrane, and an anode supported on the compartment adjacent to the membrane open to the surrounding liquid when the cell is immersed in water, inserting the cell into water and energizing the cell for treatment of water to oxidize contaminants therein.

Other objects will be apparent from time to time throughout the specification and claims as hereinafter related.

DESCRIPTION OF THE PREFERRED EMBODIMENTS

Figures 1, 2, 3:
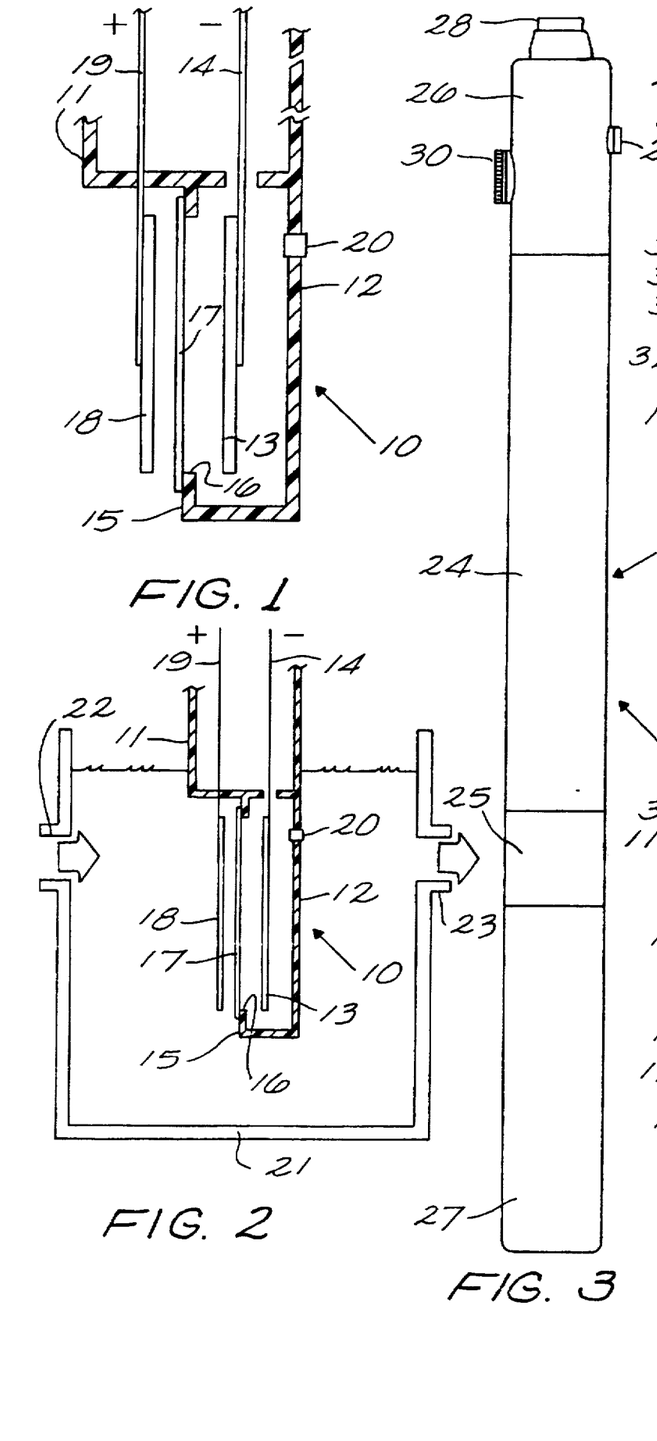
FIG. 1 is a schematic view of an electrolytic cell illustrating a preferred embodiment of the invention.
FIG. 2 is a schematic view of the electrolytic cell, as shown in FIG. 1, in a container of water being treated by the cell.
FIG. 3 is a view in elevation of the assembled housing of the cell shown in FIG. 1.

Referring to the drawings by numerals of reference, Fig.1 illustrates a preferred embodiment of a small portable electrolytic cell 10 of a size suitable for carrying on the person or in a pocket of an individual. Cell 10 has a houseing 11 which is shown more fully in the embodiments described below. Housing 11 includes an enclosed compartment 12 having an electrode 13 connected by wire 14 to a negative DC source to function as a cathode. Compartment wall 15 has an opening 16 formed therein that is closed by membrane 17.

Membrane 17 is an ion-permeable membrane which conducts cations, e.g., Na+. Ion-permeable membrane 17 is preferably a suitable cation exchange, electrically conductive membrane of the type conventionally used in electrolytic cells provided with membrane separation of the anode and the cathode compartments. The preferred membranes are fluorinated polymers and preferably perflurosulfonic acid polymers, preferably NAFION®, manufactured by Dupont.

An electrode 18 is supported on housing 11 and connected by wire 19 to a positive DC source to function as an anode. The cell 10 therefore has an enclosed cathode 13 and an exposed anode 18. When the cell 10 is placed in water or other aqueous liquid containing dissolved salt (NaCl) and energized, it will produce chlorine or other oxidants at the anode 18 and will evolve hydrogen ($H_2$) at the cathode 13. Vent opening 20 in the wall of compartment 12 is small, i.e., of a size (capillary size) permitting the venting of $H_2$ and preventing leakage of solution from the compartment 15 when inverted or laid on its side.

FIG. 2 illustrated the use of cell 10 in treatment of water. When cell 10 is immersed in water which contains, or to which there has been added, a small amount of salt, sufficient to be electrically conductive, and is energized, chlorine and other oxidants are produced at anode 18 and hydrogen and sodium ions ($Na^+$) are produced at the cathode 13. Cell 10 may be small enough to be inserted in a water tumbler or drinking glass and, when energized, produces enough chlorine and other oxidants to purify the water against bacterial contaminants. When cell 10 is manufactured, compartment 12 is charged with an alkaline (NaOH) solution for initial operation, and continued operation produces additional NaOH. In FIG. 2, the container 21 is shown as having an inlet 22 and outlet 23 for continuous water flow. The container 21 may be a water reservoir used in a home drinking water supply or the like. Container 21 may also be a holding tank for effluent from a waste water treatment facility and the treatment has been shown to be effective in eliminating bacterial contamination. If the construction is reversed so that the anode is enclosed and the cathode is exposed, the cell, when energized, produces chlorine or other oxidant in the enclosed chamber and NaOH at the exposed cathode which increases the pH of the water being treated.

FIGS. 3–7 show various details of a commercial application of the cell 10 shown in schematic views 1 and 2. Cell 10 comprises housing 11 which includes upper housing 24, lower housing 25, and upper cover 26, and a lower cover 27.

The housing components 24–27 are of cast, shaped, molded or formed plastic material, e.g., polyethylene, polypropylene, acrylic, polyurethane, etc. Upper cover 26 has a push button switch 28 (FIGS. 3–4) for operating a pilot light 29 (FIGS. 3–4), a socket 30 (FIGS. 3–4) for connection to an exterior power pack (low voltage DC output transformer), and a clip 31 (FIG. 5) for carrying or for supporting the cell on the wall of a container.

Figure 4:
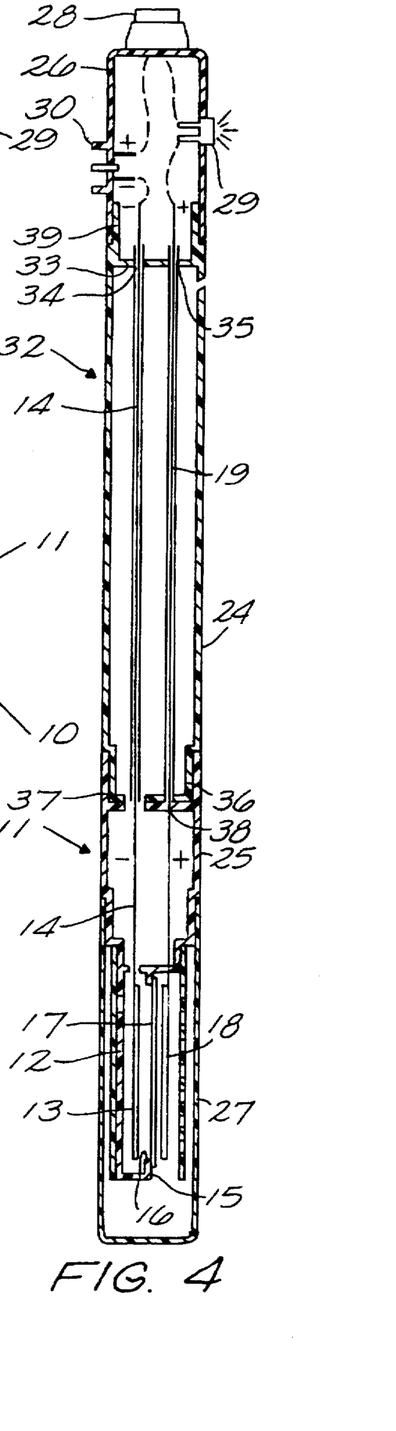
FIG. 4 is a view in longitudinal center section of the cell and housing shown in FIG. 3.
Figure 5:
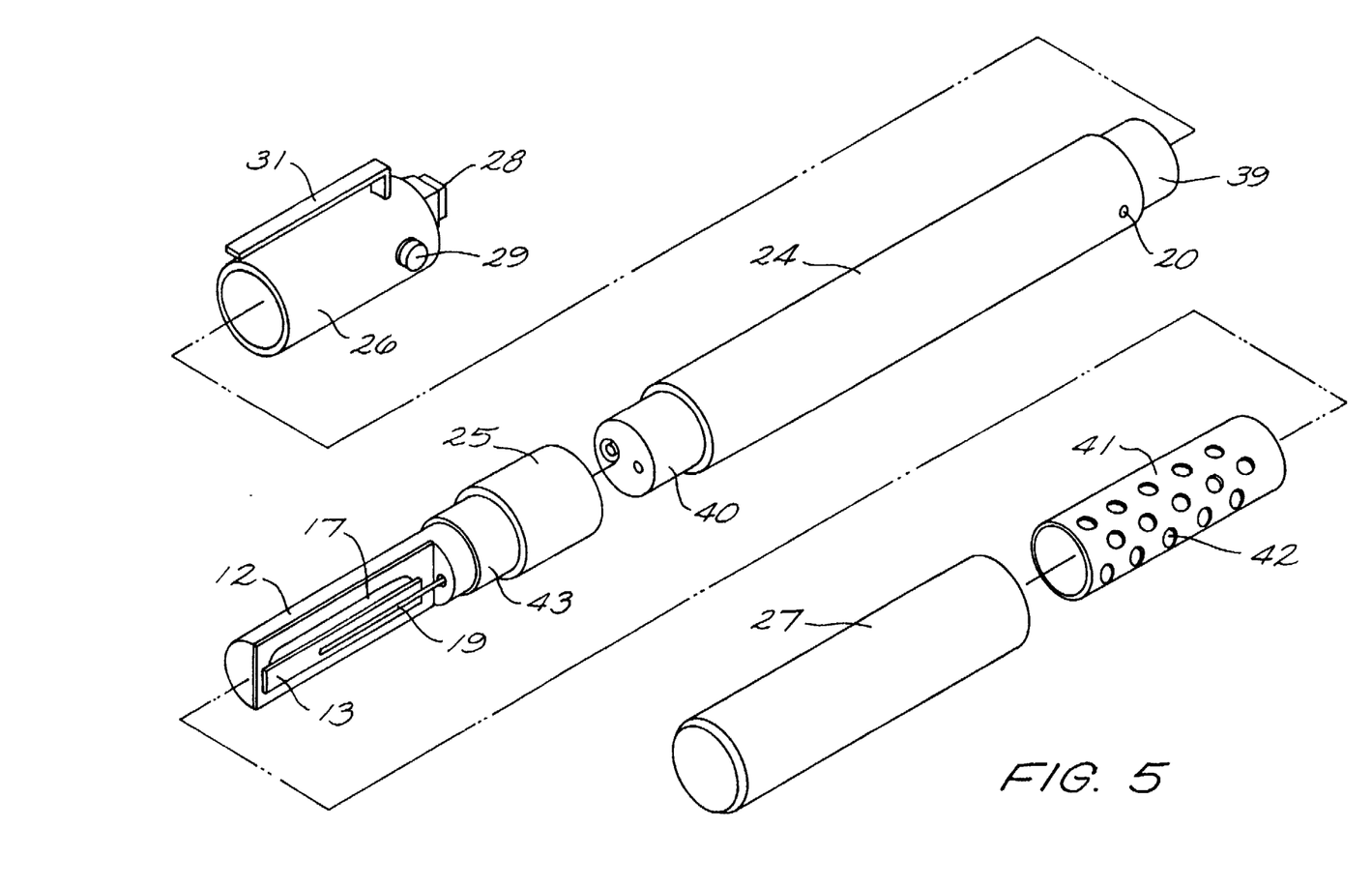
FIG. 5 is an exploded view of the cell and housing shown in FIG. 3.
Figure 6:
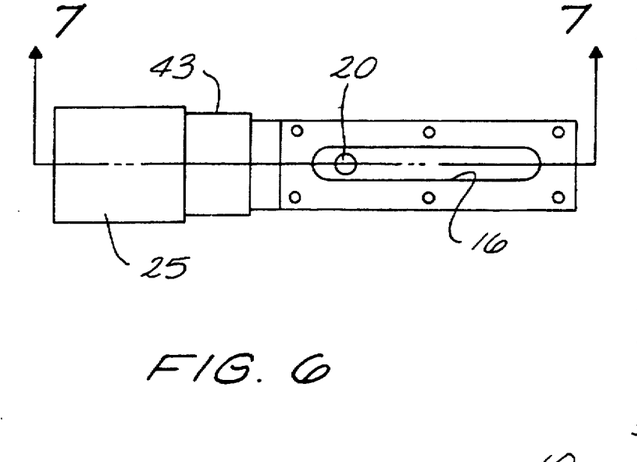
FIG. 6 is a view in elevation of part of the cell housing of the cell shown in FIG. 3.
Figure 7:
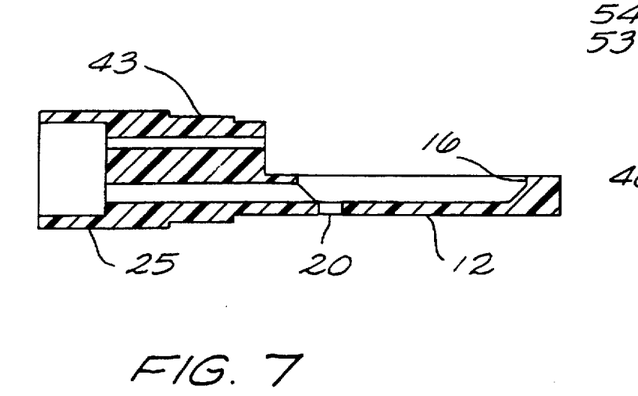
FIG. 7 is a section, taken on the line 7—7 of FIG. 6.

Upper housing component 24 is a hollow tubular member 32 having an upper wall closure 33 with openings 34 and 35, and a bottom wall closure 36 with openings 37 and 38, for passage of the wires 19 and 14 from the anode and cathode in the cell. An upper end portion 39, of reduced diameter, on tubular member 32 is secured in upper cover member 26 by a press fit. A lower end portion 40, of reduced diameter, on tubular member 32 is secured in the upper end of lower housing component 25 by a press fit.

Lower housing component 25 corresponds substantially to the cell 10 as shown and described for FIGS. 1 and 2. Housing 11 includes an enclosed compartment 12 having an electrode 13 connected by wire 14 to the negative DC side of socket 30 to function as a cathode. Compartment wall 15 has an opening 16 formed therein that is closed by membrane 17.

Membrane 17 is an ion-permeable membrane which conducts cations, e.g., $Na^+$. Ion-permeable membrane 17 is a suitable cation exchange, electrically conductive membrane, e.g., NAFION, of the type conventionally used in electrolytic cells provided with membrane separation of the anode and the cathode compartments. An electrode 18 is supported on housing 11 and connected by wire 19 to a positive DC source to function as an anode. The cell 10 therefore has an enclosed cathode 13 and an exposed anode 18.

A tubular sleeve 41, having a plurality of holes or perforations 42, (FIG. 5) is secured (by press fit) on a reduced diameter portion 43 of housing. Sleeve 41 protects the anode 13 and membrane 17 from damage in handling. Lower cover member 27 is secured by press fit on housing 25 over sleeve 41 to keep the membrane 17 from drying out when the cell is removed from the body of water in which it is used.

The cell assembly as shown in FIGS. 3–7 is carried in an assembled condition prior to use. Clip 31 permits carrying the assembly on one's clothing an may also be used to secure the cell to a wall of a container for the water of other liquid being treated. The lower cover 27 is removed at the point of use and the cell placed in position for operation. Where the cell is small, e.g. pocket size, it may be used for treating water in a tumbler or water glass. Where the cell is larger, it may be placed in a container of water in either a static or flowing condition.

As noted above, compartment 12 (enclosed cathode chamber) is charged initially with aqueous NaOH and additional NaOH is produced in operation. A small quantity of salt (NaCl) is added to the water being treated in an amount sufficient to conduct electric current. In larger size units, where a cell is used to treat effluent from a sewage treatment system, the dissolved materials in the effluent may make the addition of salt unnecessary. The cell then has an external power pack (DC-output transformer) plugged into socked 30 and switch 28 operated to energize the cell. The cell 10 thus operated as an electrolytic cell with anode 13 positioned in the water or liquid being treated. Chlorine and other oxidants are generated at the anode 13 and dissolve in the liquid to destroy harmful bacteria which may be present.

Description of Another Embodiment

Figure 8:
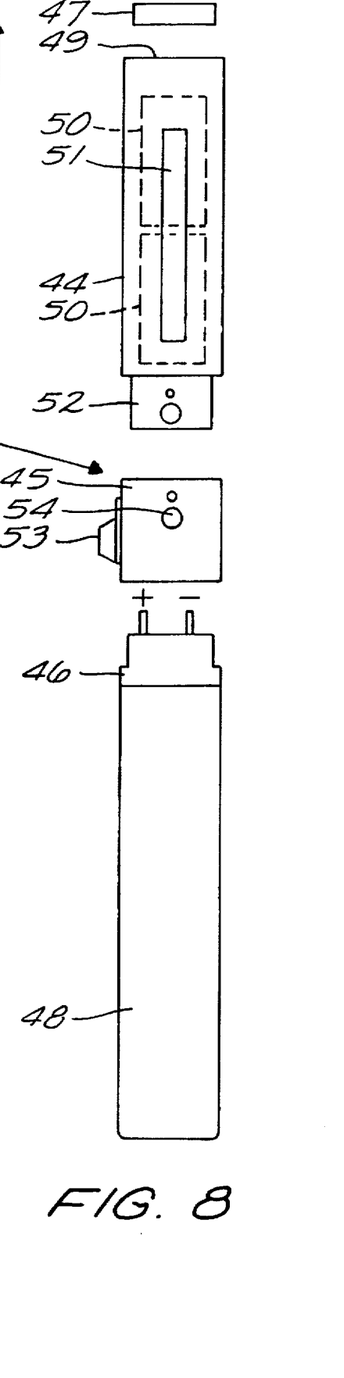
FIG. 8 is an exploded view of another embodiment of the cell and housing shown in FIGS. 3—4.

FIG. 8 is an exploded view of another embodiment of the invention which is battery operated.

Cell 10 comprises upper housing 44, lower housing 45 and 46, and upper cover 47, and a lower cover 48. The housing components 44–48 are of cast, shaped, molded or formed plastic material, e.g., polyethylene, polypropylene, acrylic, polyurethane, etc. as in FIGS. 4–7.

Upper cover 47 closes the top opening 49 in upper housing 44 to close a battery compartment containing batteries 50. Upper cover 47 has a clip 51 which has the same function as clip 31 in the embodiment of FIGS. 4–7. Upper housing component 44 has a lower end portion 52 of reduced diameter which fits into the upper end of housing portion 52 which houses a switch 53 to actuate a pilot light 54 and the electrodes of cell 10. Lower housing component 46 is substantially the same as component 25 of FIGS. 4–7. A tubular sleeve (not shown), having a plurality of holes or perforations is secured (by press fit) on a reduced diameter portion of housing 46. The sleeve protects the anode and membrane from damage in handling. Lower cover member 48 is secured by press fit on housing 46 over the sleeve to keep the membrane from drying out when the cell is removed from the body of water in which it is used.

The cell assembly as shown in FIGS. 8 is carried in an assembled condition prior to use. Clip 51 permits carrying the assembly on one's clothing an may also be used to secure the cell to a wall of a container for the water or other liquid being treated. The lower cover 48 is removed at the point of use and the cell placed in position for operation. This cell is small, e.g. pocket size, and is used for treating water in a tumbler or water glass.

As in the other embodiment, the enclosed cathode chamber is charged initially with aqueous NaOH and additional NaOH is produced in operation. A small quantity of salt (NaCl) is added to the water being treated in an amount sufficient to conduct electric current. The cell is energized by batteries 50 on operation of switch 53. The cell 10 thus operated as an electrolytic cell with the anode positioned in the water or liquid being treated. Chlorine and other oxidants are generated at the anode and dissolve in the liquid to destroy harmful bacteria which may be present.

Another Embodiment

Figure 9:
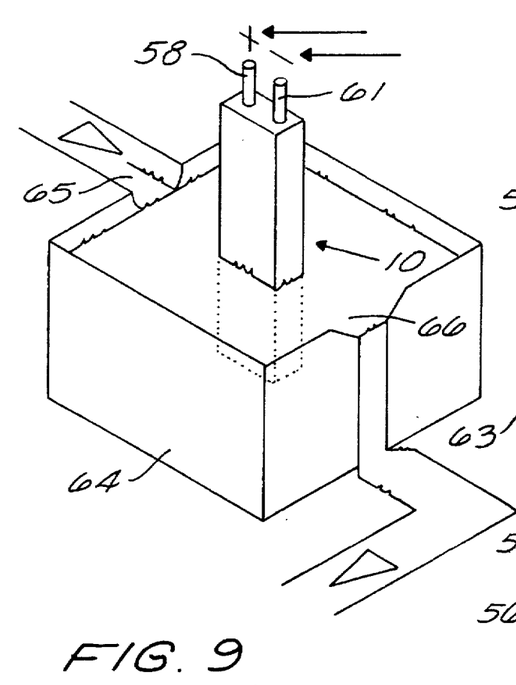
FIG. 9 is an isometric view of another embodiment of the cell, shown in FIG. 1, in a container of liquid.
Figure 10:
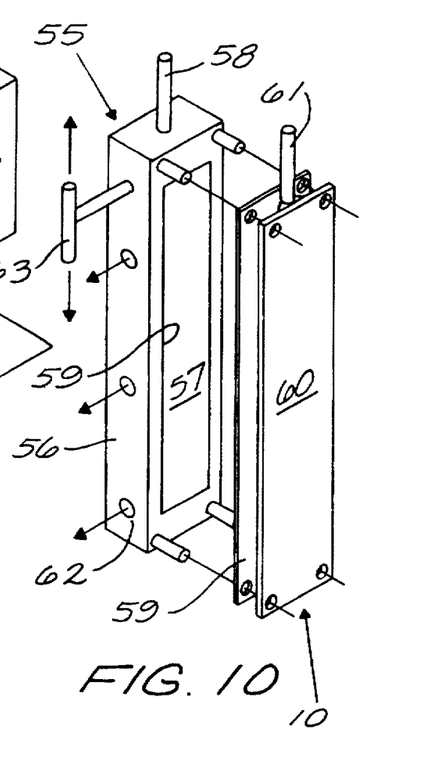
FIG. 10 is an exploded view of the cell and housing shown in FIG. 9.

FIGS. 9 and 10 show details or construction and operation of still another embodiment of the invention. This embodiment is a larger size sell and is used for larger water treatment facilities and for treating effluent from sewage treatment facilities. FIG. 9 shows this embodiment of cell 10 in operation in a flowing liquid treatment system. FIG. 10 shows details of the cell 10.

Cell 10 has a housing 55 which includes an enclosed compartment 56 having an electrode 57 connected by wire 58 to a negative DC source to function as a cathode. Compartment 56 has an opening 58 is closed by membrane 59. Membrane 59 is an ion-permeable membrane which conducts cations, e.g., Na+. Ion-permeable membrane 59 is preferably a suitable cation exchange, electrically conductive membrane of the type conventionally used in electrolytic cells (preferably NAFION) provided with membrane separation of the anode and the cathode compartments.

An electrode 60 is supported on housing 56 and connected by wire 61 to a positive DC source to function as an anode. The cell 10 therefore has an enclosed cathode 57 and an exposed anode 60. When the cell 10 is placed in water or other aqueous liquid containing dissolved salt (NaCl) and energized, it will produce chlorine or other oxidants at the anode 60 and will evolve hydrogen ($H_2$) at the cathode 57. Openings 62 and tubes 63 in the wall of compartment 56 provide for circulating water through the cathode compartment to cool the cell during operation at high amperages.

FIG. 9 illustrates the use of cell 10 in treatment of large quantities of water. When cell 10 is immersed in water which contains, or to which there has been added, a small amount of salt, sufficient to be electrically conductive, and is energized, chlorine and other oxidants are produced at anode 60 and hydrogen and sodium ions ($Na^+$) are produced at the cathode 57. When cell 10 is manufactured, compartment 56 is charged with an alkaline (NaOH) solution for initial operation, and continued operation produces additional NaOH. In FIG. 9, the container 64 is shown as having an inlet 65 and outlet 66 for continuous water flow.

Other Embodiment

Figure 11:
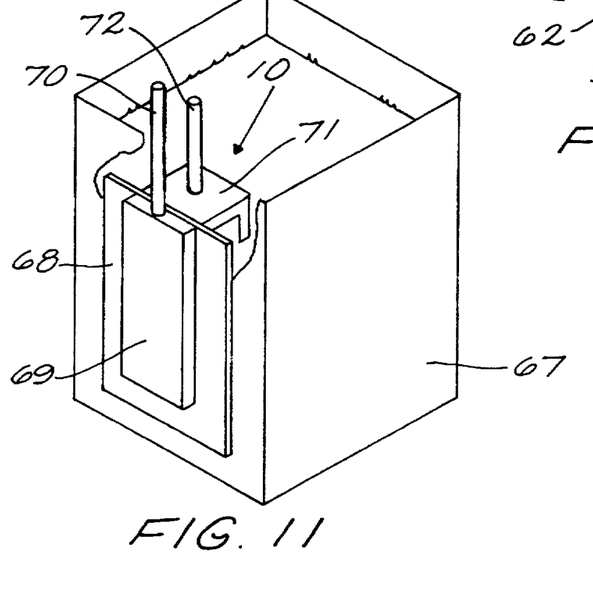
FIG. 11 is an isometric view of another embodiment of the cell installed in the wall of a container of liquid.

FIG. 11 shows still another embodiment of the invention in which the anode is immersed in the body of water being treated and the cathode is exposed and without any solution present.

A container 67 has cell 10 (modified) supported in a water-tight opening in the wall thereof. Membrane 68 and cathode 69 are positioned outside the container 67. A wire 70 is connected to the negative side of a DC power supply. Anode 71 is secured on cathode 69 and has wire 72 connected to the positive side of the DC power supply.

The container 67 is filled with water and a small amount of salt added. When the a current is passed between the anode 71 and cathode 69, bubbles of chlorine are evolved at the anode 71, even though there is no liquid at cathode 69 other than a small amount which wets the membrane and contacts the cathode. This cell is relatively inefficient but does produce chlorine gas.

Another Embodiment

Figure 12:
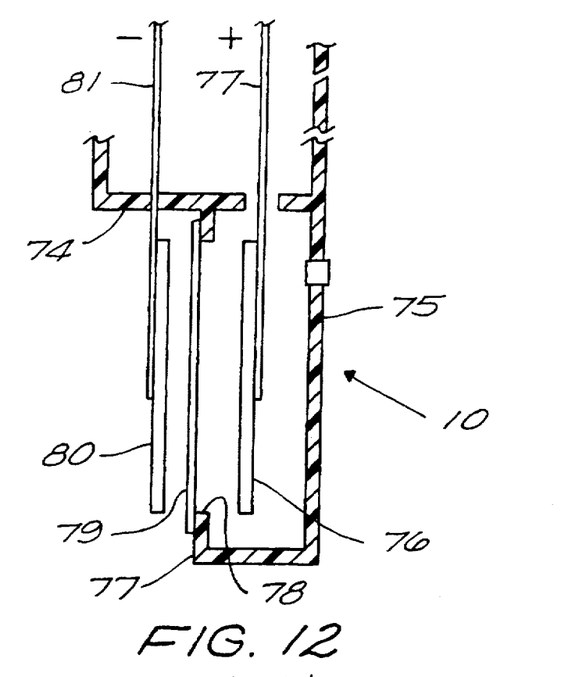
FIG. 12 is a schematic view of an electrolytic cell illustrating another embodiment of the invention.
Figure 13:
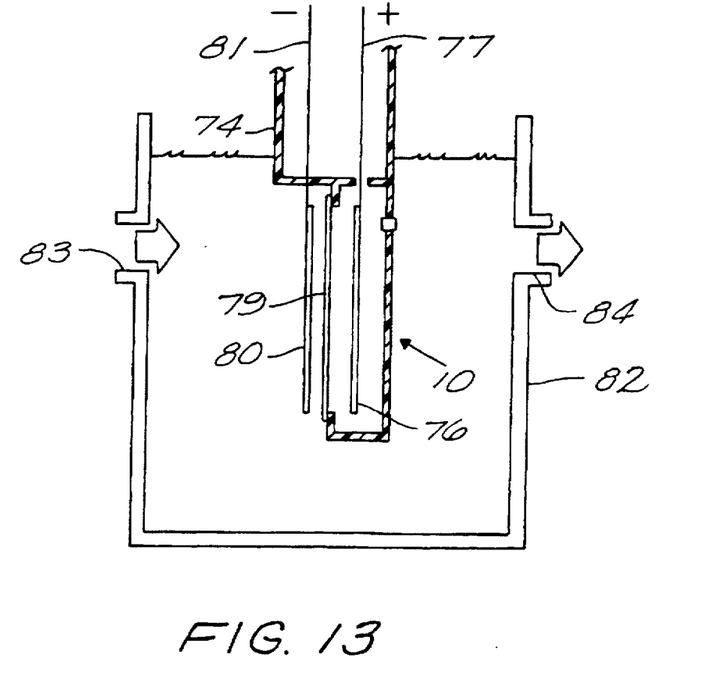
FIG. 13 is a schematic view of the electrolytic cell, as shown in FIG. 12, in a container of water being treated by the cell.

In FIGS. 12 and 13, there is shown another embodiment of the invention in which the relative positions of the anode and cathode are reversed.

Referring to Fig.12, there is shown a cell 10 which has a housing 74 including an enclosed compartment 75 having an electrode 76 connected by wire 77 to a positive DC source to function as an anode. Compartment wall 77 has an opening 78 formed therein that is closed by membrane 79.

Membrane 79 is an ion-permeable membrane which conducts cations, e.g., Na+. Ion-permeable membrane 79 is preferably a suitable cation exchange, electrically conductive membrane of the type conventionally used in electrolytic cells provided with membrane separation of the anode and the cathode compartments. The preferred membranes are fluorinated polymers and preferably perflurosulfonic acid polymers, preferably NAFION®, manufactured by Dupont.

An electrode 80 is supported on housing 74 and connected by wire 81 to a negative DC source to function as a cathode. The cell 10 therefore has an enclosed anode 76 and an exposed cathode 80. When the cell 10 is placed in water or other aqueous liquid containing solute for electrical conductivity and compartment 75 has NaCl added, and the cell energized, it will produce chlorine or other oxidants at the anode 76 (in compartment 75) and will evolve hydrogen ($H_2$) and Na+ ions at the cathode 80.

FIG. 13 illustrated the use of cell 10 of FIG. 12, in treatment of water. When cell 10 is immersed in water which contains, or to which there has been added, a small amount of solute, sufficient to be electrically conductive, and NaCl solution is added to compartment 75, and the cell is energized, chlorine and other oxidants are produced at anode 76 and hydrogen and sodium ions ($Na^+$) are produced at the cathode 80. This has the effect of substantially raising the pH of the water to pH 10 or higher. In FIG. 13, the container 82 is shown as having an inlet 83 and outlet 84 for continuous water flow.

While this invention has been described fully and completely with special emphasis upon several preferred embodiments, it should be understood that within the scope of the appended claims the invention may be practiced otherwise than as specifically described herein.

I claim:

1. A small portable electrolytic cell having an enclosed electrode and an exposed electrode, an electrolyte in contact with said enclosed electrode, and no electrolyte in contact with said exposed electrode, and said cell being operable when immersed in aqueous liquid electrolyte to generate chlorine or other oxidant when

11 said exposed electrode is an anode, or to increase the pH of said liquid when said exposed electrode is a cathode.

2. An electrolytic cell according to claim 1 including an ion-permeable membrane positioned between said electrodes.

3. An electrolytic cell according to claim 1 including a hook for supporting the cell on the wall of a container of water being treated.

4. An electrolytic cell according to claim 1 in which said cell is of a size suitable for carrying on the person or in a pocket of an individual, for treatment of water to oxidize contaminants or to raise the pH of the water.

5. An electrolytic cell according to claim 1 in which said cell includes batteries or a D.C.-output transformer to supply power thereto.

6. An electrolytic cell according to claim 1 in which said cell comprises an enclosed compartment, one electrode enclosed in said compartment, another electrode supported on said compartment and open to said aqueous liquid when the cell is immersed therein.

7. An electrolytic cell according to claim 6 in which said one electrode is a cathode, and said another electrode is an anode.

8. An electrolytic cell according to claim 6 in which said one electrode is an anode, said another electrode is a cathode and an ion-permeable membrane secured between said electrodes.

9. An electrolytic cell according to claim 6 in which said compartment has an opening in a wall thereof, an ion-permeable membrane secured in said compartment wall opening, and said another electrode being supported on said compartment adjacent to said membrane and open to the surrounding liquid when the cell is immersed therein.

10. An electrolytic cell according to claim 9 in which said one electrode is a cathode, and said another electrode is an anode.

11. An electrolytic cell according to claim 6 in which said enclosed compartment has a vent opening in one wall thereof of a size permitting venting of gas but small enough to prevent leakage of liquid therethrough.

12. A small portable electrolytic cell comprising an enclosed compartment, a cathode enclosed in said compartment, said compartment has an opening in a wall thereof, an ion-permeable membrane secured in said compartment wall opening, and an electrolyte in contact with said enclosed electrode, said cell being operable when immersed in aqueous liquid to generate chlorine or other oxidant when said exposed electrode is an anode, or to increase the pH of said liquid when said exposed electrode is a cathode, an anode supported on said compartment adjacent to said membrane and open to said aqueous liquid when the cell is immersed therein, and a plurality of passageways for circulating cooling water through enclosed compartment.

13. A small portable electrolytic cell comprising an enclosed compartment,

12 one electrode enclosed in said compartment, said cell being operable when immersed in aqueous liquid to generate chlorine or other oxidant when said exposed electrode is an anode, or to increase the pH of said liquid when said exposed electrode is a cathode, another electrode supported on said compartment and open to said aqueous liquid when the cell is immersed therein, and a perforated tubular shield supported on and surrounding said compartment and said another electrode.

14. An electrolytic cell according to claim 13 in which said enclosed compartment is at least partially of circular cross section, said another electrode and said compartment are of a size fitting within said perforated tubular shield, and a cylindrical cover member removably fitting over said tubular shield.

15. A small portable electrolytic cell having an enclosed electrode and an exposed electrode, said cell comprises a tubular housing formed in at least three sections, an upper housing section including means for supplying power to the cell, a center housing section comprising an enclosed compartment, one electrode enclosed in said compartment, another electrode supported on said compartment and open to aqueous liquid electrolyte when the cell is immersed therein, a perforated tubular shield supported on and surrounding said compartment and said another electrode, and a lower housing section comprising a closed end tubular cover fitting over and closing said center housing section, an electrolyte in contact with said enclosed electrode, and said cell being operable when immersed in aqueous liquid to generate chlorine or other oxidant when said exposed electrode is an anode, or to increase the pH of said liquid when said exposed electrode is a cathode.

16. An electrolytic cell having:

a container adapted to contain an electrolyte, an anode positioned in said electrolyte when said container is provided with electrolyte, a cathode spaced from said anode and positioned outside said electrolyte when electrolyte is provided in said container, an ion-permeable membrane positioned between said anode and said cathode and in contact with said cathode, and a DC power source connected to said anode and said cathode, said cell being operable to generate a gas derived from said electrolyte when electrolyte is provided in said container at the surface of said anode inside said container.

17. An electrolytic cell according to claim 16 in which said container has an opening in a container wall, said anode, said ion-permeable membrane, and said cathode being secured together in intimate contact as an electrode unit positioned in said container wall opening with said anode facing inwardly of said container to contact electrolyte when provided in said container and said cathode facing outwardly of said container out of contact with said electrolyte when provided in said container.

18. An electrolytic cell according to claim 16 in which said container has an opening in a container wall, said anode, said ion-permeable membrane, and said cathode being secured together in intimate contact as an electrode unit positioned in said container wall opening with said anode facing inwardly of said container to contact electrolyte when provided in said container and said cathode facing outwardly of said container out of contact with said electrolyte when provided in said container, said electrode unit being removably secured in said container wall opening.

19. A method of treating aqueous liquid to purify it or to increase its pH comprising the steps of:

(a) providing a small portable electrolytic cell having an enclosed electrode and an exposed electrode, and an electrolyte in contact with said enclosed electrode, and no electrolyte in contact with said exposed electrode, (b) dissolving a salt in aqueous liquid to be treated to produce an electrolyte, and (c) immersing said cell in said aqueous liquid electrolyte to contact said exposed electrode with said electrolyte and energizing said cell to generate chlorine or other oxidant when said exposed electrode is an anode, or to increase the pH of said liquid when said exposed electrode is a cathode.

20. method according to claim 19 in which said enclosed electrode is a cathode, said exposed electrode is an anode, an ion-permeable membrane is positioned between said anode and said cathode, the electrolytes is aqueous solution of a chloride salt, and the product from said anode when said cell is energized is chlorine and other oxidants.

21. A method according to claim 19 in which said enclosed electrode is an anode, said exposed electrode is a cathode, an ion-permeable membrane is positioned between said anode and said cathode, the electrolyte is aqueous solution of a salt, and said cathode releases NaOH when said cell is energized to raise the pH of the water in the electrolyte.

22. A method according to claim 19 in which said cell includes a housing having a hook thereon, and said cell is placed in a container with said hook supporting the cell for operation.

23. A method according to claim 19 in which said cell includes a compartment with an opening in a wall thereof, an ion-permeable membrane secured in said compartment wall opening, and said another electrode being supported on said compartment adjacent to said membrane and open to the surrounding liquid when the cell is immersed therein.

24. A method according to claim 19 in which said one electrode is a cathode, and said another electrode is an anode, said cell includes a compartment with an opening in a wall thereof, an ion-permeable membrane secured in said compartment wall opening, and said anode being supported on said compartment adjacent to said membrane and open to the surrounding liquid when the cell is immersed therein.

25. A method according to claim 19 including the step of circulating cooling water through said enclosed compartment.

26. An electrode unit to be positioned and secured in an opening in a wall of a container for an aqueous electrolyte, said electrode unit comprising an anode, an ion-permeable membrane, and a cathode secured together in intimate contact as a unitary removable electrode unit to be positioned in a container wall opening with said anode facing inwardly of said container to contact electrolyte when provided in said container and said cathode facing outwardly of said container out of contact with said electrolyte when provided in said container.

* * * * *